US008108227B1

(12) United States Patent  
Rogers et al.

(10) Patent No.: US 8,108,227 B1  
(45) Date of Patent: Jan. 31, 2012

(54) METHOD AND SYSTEM FOR PROVIDING HEALTHCARE CLAIMS ASSISTANCE

(75) Inventors: Lisa Herrup Rogers, Palo Alto, CA (US); Beth Goldman, San Francisco, CA (US); Lyda Woods, Talent, OR (US); Jeffrey Lui, Mountain View, CA (US); Craig LaSalle, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 460 days.

(21) Appl. No.: 12/271,242

(22) Filed: Nov. 14, 2008

(51) Int. Cl.  
*G06Q 10/00* (2006.01)  
*G06Q 40/00* (2006.01)

(52) U.S. Cl. ............ 705/3; 705/2; 705/4; 707/610

(58) Field of Classification Search .......... 705/2, 3  
See application file for complete search history.

(56) References Cited

U.S. PATENT DOCUMENTS

| | | | |
|---|---|---|---|
| 7,275,110 B2 * | 9/2007 | Umbreit ........................ 709/229 |
| 7,729,989 B1 * | 6/2010 | Yuen et al. ..................... 705/44 |
| 2002/0016721 A1 * | 2/2002 | Mason et al. .................... 705/3 |
| 2003/0233249 A1 * | 12/2003 | Walsh et al. ..................... 705/1 |
| 2005/0033606 A1 * | 2/2005 | Miller ............................ 705/2 |
| 2005/0187797 A1 * | 8/2005 | Johnson ......................... 705/3 |
| 2006/0195339 A1 * | 8/2006 | Backhaus et al. ................ 705/2 |
| 2007/0042329 A1 * | 2/2007 | Curtin et al. ................. 434/108 |
| 2007/0050219 A1 * | 3/2007 | Sohr et al. ....................... 705/4 |
| 2009/0144088 A1 * | 6/2009 | Zubiller et al. .................. 705/3 |

* cited by examiner

*Primary Examiner* — Vivek Koppikar  
*Assistant Examiner* — Edward B. Winston, III  
(74) *Attorney, Agent, or Firm* — McKay and Hodgson, LLP; Philip McKay

(57) ABSTRACT

A system and method for providing healthcare claims assistance whereby a given healthcare service consumer's healthcare services data relating to a given healthcare service item is obtained and is translated into a description of the services in language, and/or a format, that a typical healthcare service consumer can understand. The healthcare service consumer's healthcare services data is also used to present the healthcare service consumer with a payment calculation display and an explanation of how the healthcare service consumer's portion of the claim amount was calculated. The healthcare services consumer is then provided advice on who to contact and/or how to proceed to resolve any perceived errors and/or obtain more detailed information.

27 Claims, 3 Drawing Sheets

Claim Details

Claim #: 1234567890 ~ 301  
800-555-1234

Date of Service: 04/18/2007  Provider: University Diabetes Clinic ~ 305
Patient: Kelly ~ 309  In-Network Tel: 573-555-0987
       ~ 307

My Responsibility    =   I Paid           =   I Owe
$427.30                  $20.00               University Diabetes Clinic
                         (Copay)              $407.30
                         303
                         [Payments]           ✓ Mark as Paid

| | | | |
|---|---|---|---|
| Extended Office Visit | 199.85 | 0.00 | ⊘ Denied  199.85 |
| Heart Ultrasound | 196.96 | 0.00 | ⊘ Denied  196.96 |
| Heart Ultrasound | | | 311 |

ⓘ Explanation: This service was adjusted or denied because it is missing a valid
pre-authorization. Additional Insurance Remark
See "What to Do">>                                                       313
☐ Review Insurance Benifits Type here to capture any questions, request, and responses

---

Claim Assistant

Your Health Plan denied payment
for the service: Heart Ultrasound

This service was adjusted or denied
because it is missing a valid
pre-authorization.                 315

What to do
Contact your primary care physician to
verify that this authorization was sent
to your Health Plan.               317

Is there something else     [Yes] [No]
you want help with?

💡 Tip: You can quickly view financial
information by clicking on the
Insurance Paid or My Responsibility
on each service line.

[More Info] [Glossary]   ☐ Insurance

[OK]          [Cancel]

METHOD AND SYSTEM FOR PROVIDING HEALTHCARE CLAIMS ASSISTANCE

BACKGROUND

For many healthcare service consumers understanding the processes, procedures, codes, calculations, and vocabulary associated with healthcare service claims is difficult and confusing. As a result, in many instances, when the healthcare service consumer receives a bill form a healthcare service provider or an Explanation Of Benefits (EOB) from a healthcare insurance provider, the healthcare service consumer often has no idea how the amount billed was generated and/or determined, how their share of the cost was generated and/or determined, and/or how to proceed if they disagree with either of these amounts. To a large degree this is because the healthcare service bills and/or EOBs are often written in medical terms not discernible by the average healthcare service consumer and/or use codes that are typically completely unfamiliar to the average healthcare service consumer.

This situation is particularly problematic when the healthcare service consumer is presented with a bill that is either not expected at all, or that is for an unexpected amount. In these instances, not only does the healthcare service consumer often fail to understand how the bill was generated, and/or why the bill is not for the amount expected, but, in many cases, the healthcare consumer has no idea what party to contact to discuss and/or challenge the bill, much less what department associated with a given party is needed.

For instance, when a bill is not understood and/or a perceived error is discovered, in many cases the healthcare service consumer does not know whether to contact the healthcare insurance provider, his or her healthcare service plan administrator, the healthcare service provider, the healthcare service consumer's employer, or even a collection agency that has contacted the healthcare consumer. For this reason alone, many healthcare service providers, healthcare insurance providers, employers, and/or healthcare service plan administrators lose precious time dealing with phone calls and letters from healthcare service consumers that have been incorrectly directed to their offices. This wasted time is in addition to the time wasted by the healthcare service consumers themselves attempting to determine who to contact, waiting on hold, navigating seemingly endless voicemail menus and automated responses, and then, often as not, being yet again redirected to a different contact to start the process over again.

In addition, even if the healthcare service consumer is able to contact a given party that may, or may not, be the right contact, they still often do not understand the information they have been provided from their bills and/or EOBs and often are unable to identify and/or provide the contacted party with the information regarding the bill that both they and the party will need to proceed. Indeed, the situation can be so confusing for some healthcare service consumers they do not even know how to describe their issues in a way that can allow any party to determine whether they are the proper contact or not.

As a result of the situation described above, not only are many healthcare service consumers forced to use their precious "free time" trying to deal with healthcare service disputes, and often only getting more frustration for their efforts, but, as noted, many healthcare service providers, healthcare insurance providers, employers, and/or plan administrators lose precious employee time dealing with phone calls and letters from healthcare service consumers who have incorrectly called their offices. Consequently, the current situation is far from ideal for virtually all parties involved in the healthcare industry, and often results in frustrated and angry healthcare service consumers.

SUMMARY

In accordance with one embodiment, a system and method for providing healthcare claims assistance includes a process for providing healthcare claims assistance whereby a given healthcare service consumer's healthcare services data relating to a given healthcare service item is obtained by the process for providing healthcare claims assistance. In one embodiment, the healthcare service consumer's healthcare services data is then translated by the process for providing healthcare claims assistance into a description of the services provided in language, and/or a format, that a typical healthcare service consumer can understand, i.e., translated into "layman terms". In one embodiment, the given healthcare service consumer's healthcare services data is also used by the process for providing healthcare claims assistance to present the healthcare service consumer with a payment calculation display and/or an explanation of how the healthcare service consumer's portion of the claim amount was calculated. In one embodiment, any errors in the given healthcare service consumer's healthcare services data, as perceived by the healthcare service consumer and/or the process for providing healthcare claims assistance, or areas where the healthcare service consumer desires more detail, are identified. In one embodiment, the process for providing healthcare claims assistance then provides the healthcare services consumer with advice on how to proceed to resolve the perceived errors, or further investigate one or more issues, including, but not limited to: advice on what data to double check to insure a perceived error is indeed a legitimate potential error; advice on what party to contact, and in some cases what department within a given party to contact; advice on what information/documentation to have ready; advice on how to state the complaint/description of a perceived error. In one embodiment, the process for providing healthcare claims assistance also provides the healthcare services consumer with any forms required to resolve any perceived errors, or obtain more information, and, in one embodiment, automatically pre-populates the forms with at least part of the relevant healthcare consumer's data.

In one embodiment, a given healthcare service consumer's healthcare services data related to a given healthcare service item includes, but is not limited to: healthcare claims data as submitted by one or more healthcare service providers to one or more healthcare insurance providers; EOB data from one or more healthcare insurance providers; invoice data submitted to the healthcare service consumer by one or more healthcare service providers; and/or any other healthcare services data related to a given healthcare service item from one or more healthcare insurance providers, and/or one or more healthcare service plan administrators, and/or one or more healthcare service providers, and/or the healthcare service consumer, and/or one or more other parties such as, but not limited to, healthcare expense account program providers, healthcare expense account program administrators, and/or any other parties generating and/or having access to an individual's healthcare claims data.

In one embodiment, the given healthcare service consumer's healthcare services data includes, but is not limited to: dates of service; types of services rendered; healthcare service codes; claim amounts submitted by healthcare service providers; billing codes; healthcare insurance provider EOB codes; and/or healthcare insurance provider rules governing one or more healthcare insurance plans associated with the healthcare service consumer.

In one embodiment, the given healthcare service consumer's healthcare services data is translated by the process for providing healthcare claims assistance into language and/or a format that a typical healthcare service consumer can understand using one or more databases and/or lookup tables correlating healthcare service provider codes and/or healthcare insurance provider codes to types of healthcare services rendered.

In one embodiment, the given healthcare service consumer's healthcare services data is also used by the process for providing healthcare claims assistance to present the healthcare service consumer with a payment calculation display and an explanation of how the healthcare service consumer's portion of the claim amount was calculated. In one embodiment, the payment calculation display includes a display of the various costs involved and/or the calculus used by the healthcare insurance provider and/or healthcare service provider to determine the healthcare service consumer's bill. In one embodiment, the payment calculation display includes a spreadsheet type of display of healthcare insurance plan particulars such as, but not limited to: any payments already made; co-payments required; deductibles; allowed claim amounts; non-allowed claims amounts, and explanations as to why the amounts were not allowed; in-network and out-of-network services; and/or any adjustments made and an explanation of the adjustments. In one embodiment, the healthcare service consumer is provided with this data along with an explanation of how the healthcare service consumer's portion of the claim amount was calculated in a broken down and more easily understood manner than is typically offered healthcare service provider bills and/or healthcare insurance provider's EOBs.

In one embodiment, the given healthcare service consumer's healthcare services data is checked for potential problems such as a denied claims and the healthcare service consumer is alerted any potential problems. In one embodiment, an analysis is made by the process for providing healthcare claims assistance, based on the obtained healthcare services data for the given healthcare service consumer, as to where any potential errors may have been made in processing the healthcare service consumer's claim and/or in calculating the healthcare service consumer's bill by either the healthcare service provider, the healthcare insurance provider, and/or the healthcare service consumer.

In one embodiment, if the healthcare services consumer perceives that an error was made, or if the healthcare services consumer desires more information on a specific issue/entry, the healthcare services consumer indicates where they feel an error was made. In one embodiment, the process for providing healthcare claims assistance then provides the healthcare service consumer with possible reasons why any perceived error may have occurred and/or potential issues the healthcare services consumer may have missed that may have resulted in their miscalculation of their bill.

In one embodiment, if it is determined that a potential error was made, or if the healthcare services consumer indicates that they wish to proceed with a challenge to a perceived error, or if the healthcare services consumer desires more information on a specific issue/entry, the process for providing healthcare claims assistance provides the healthcare service consumer with possible reasons for the error, or provides more detailed data, and/or informs the healthcare services consumer which party, i.e., the healthcare insurance provider, the healthcare service provider, a healthcare plan administrator, an employer, and/or other party, should be contacted. In one embodiment, the process for providing healthcare claims assistance also provides the healthcare consumer with information regarding what department to contact and what process for resolving the issues is to be expected. In one embodiment, the process for providing healthcare claims assistance also initiates a dispute process with the appropriate party and/or pre-populates one or more forms associated with the dispute process using the given healthcare service consumer's healthcare services data.

Using the process for providing healthcare claims assistance, as disclosed herein, healthcare service consumers are provided with: a description of the healthcare services provided in language and/or a format that a typical healthcare service consumer can understand; a payment calculation display including an explanation of how the healthcare service consumer's portion of the claim amount was calculated; and advice on how to proceed to resolve any perceived errors, including, but not limited to, advice on what data to double check to insure the perceived error is indeed a legitimate potential error, advice on what party to contact, and in some cases what department within a given party to contact, advice on what information/documentation to have ready, advice on how to state the complaint/description of perceived error. Consequently, using the process for providing healthcare claims assistance, as disclosed herein, healthcare consumers are better informed and save significant time resolving potential issues with their healthcare service bills. In addition, using the process for providing healthcare claims assistance, as disclosed herein, healthcare service providers, healthcare insurance providers, employers, and/or plan administrators, spend less time dealing with phone calls and letters from healthcare service consumers who have incorrectly called their offices.

BRIEF DESCRIPTION OF THE DRAWINGS

FIG. 3 is a representation of a display screen generated in accordance with one embodiment including a user interface display in accordance with one embodiment.

Figure 1:
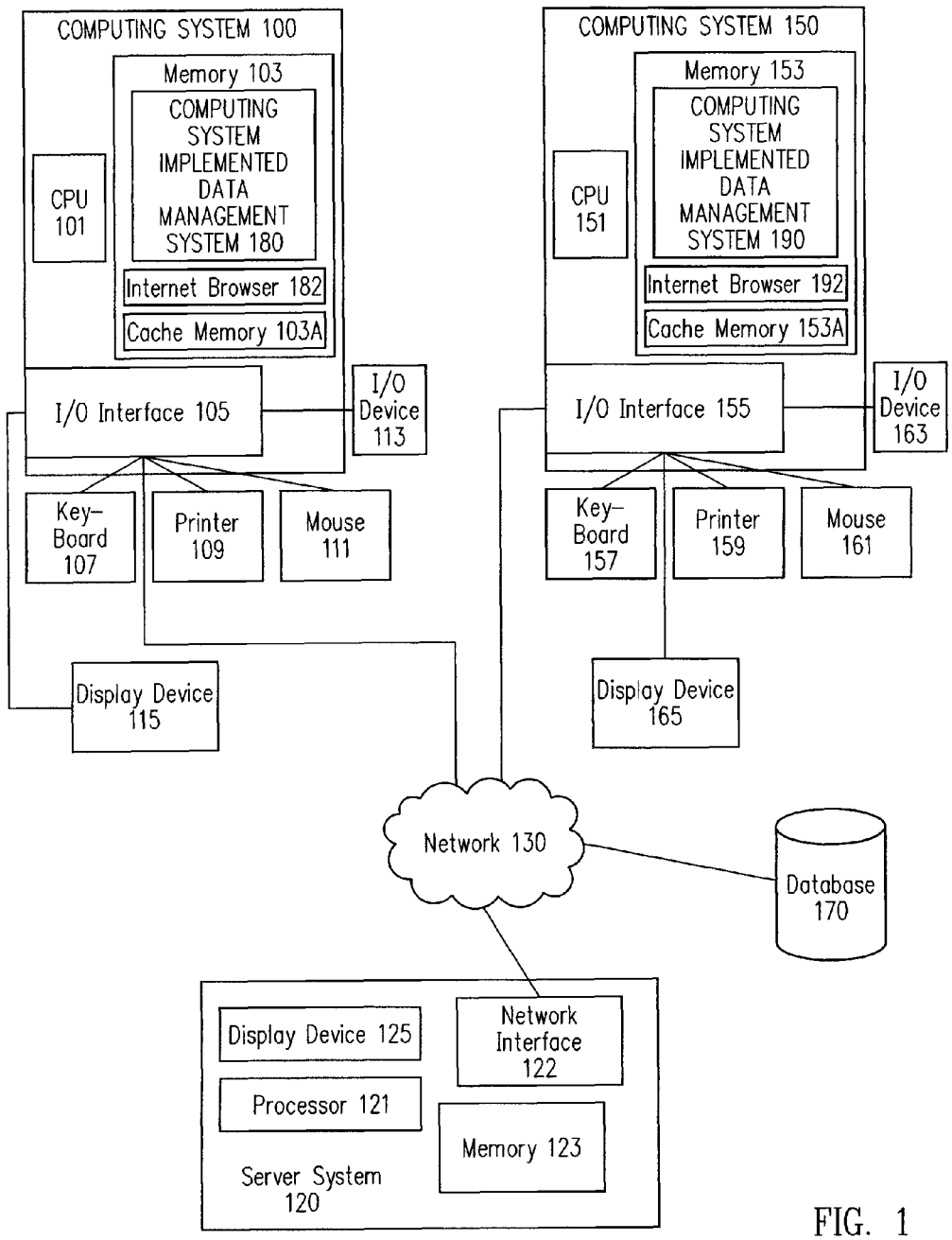
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

In particular, the display screens and user interface elements shown in the FIG.s are merely exemplary; other layouts, arrangements, formats, and user interface features may be provided without departing from the characteristics of the invention as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing healthcare claims assistance includes a process for providing healthcare claims assistance whereby a given healthcare service consumer's healthcare services data relating to a given healthcare service item is obtained by the process for providing healthcare claims assistance. In one embodiment, the healthcare service consumer's healthcare services data is then translated by the process for providing healthcare claims assistance into a description of the services provided in language, and/or a format, that a typical healthcare service consumer can understand, i.e., translated into "layman terms". In one embodiment, the given healthcare service consumer's healthcare services data is also used by the process for providing healthcare claims assistance to present the healthcare service consumer with a payment calculation display and/or an explanation of how the healthcare service consumer's portion of the claim amount was calculated. In one embodiment, any errors in the given healthcare service consumer's healthcare services data, as perceived by the healthcare service consumer and/or the process for providing healthcare claims assistance, or areas where the healthcare service consumer desires more detail, are identified. In one embodiment, the process for providing healthcare claims assistance then provides the healthcare services consumer with advice on how to proceed to resolve the perceived errors, or further investigate one or more issues, including, but not limited to: advice on what data to double check to insure a perceived error is indeed a legitimate potential error; advice on what party to contact, and in some cases what department within a given party to contact; advice on what information/documentation to have ready; advice on how to state the complaint/description of a perceived error. In one embodiment, the process for providing healthcare claims assistance also provides the healthcare services consumer with any forms required to resolve any perceived errors, or obtain more information, and, in one embodiment, automatically pre-populates the forms with at least part of the relevant healthcare consumer's data.

Hardware System Architecture

FIG. 1 is a block diagram of an exemplary hardware architecture for implementing one embodiment of a system and method for providing healthcare claims assistance, such as exemplary process 200 (FIG. 2) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180, such as any computing system implemented data management system discussed herein, and/or known in the art at the time of filing, and/or as developed thereafter. In one embodiment, computing system implemented data management system 180 is a computing system implemented healthcare management system, as described herein, and/or known in the art at the time of filing, and/or as developed thereafter. In one embodiment, computing system implemented data management system 180 is stored, in whole, or in part, in memory 103, and is used by, or includes, or is accessed by, a process for providing healthcare claims assistance.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. In one embodiment, a process for providing healthcare claims assistance and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data representing and/or associated with one or more healthcare service items associated with one or more healthcare service consumers, in one or more formats, is stored, in whole, or in part, in memory system 103, and is used by, or is accessed by, a process for providing healthcare claims assistance and/or one or more consumers. In one embodiment, computing system 100 is a computing system accessible by one or more healthcare consumers and/or users. In one embodiment, computing system 100 is used, and/or accessible, by another computing system, such as computing system 150 (discussed below).

In one embodiment, computing system 100 is used, controlled, and/or accessible by, one or more healthcare service providers, and/or one or more healthcare insurance providers, and/or one or more healthcare consumers, and/or a provider of and/or a computing system implemented data management system, and data representing and/or associated with one or more healthcare service items associated with one or more healthcare service consumers, is stored in computing system 100, typically in accounts associated with a given healthcare consumer.

Computing system 100 can be any computing system as defined herein and/or as known in the art at the time of filing and/or as developed thereafter, that includes components that can execute all, or part, of a process for providing healthcare claims assistance, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system defined herein, known in the art at the time of filing, and/or as developed thereafter. In one embodiment, computing system implemented data management system 190 is stored, in whole, or in part, in memory system 153, and is used by, or includes, or is accessed by, a process for providing healthcare claims assistance.

In one embodiment, data representing and/or associated with one or more healthcare service items associated with one or more healthcare service consumers, in one or more formats, is stored, in whole, or in part, in memory system 153, and is used by, or is accessed by, a process for providing healthcare claims assistance and/or one or more users. In one embodiment, computing system 150 is a computing system accessible by one or more computing system implemented healthcare management systems, one or more healthcare service providers, and/or one or more healthcare insurance providers, and/or one or more healthcare consumers, and/or a provider of and/or a computing system implemented data management system. In one embodiment, computing system 150 is used, and/or accessible, by another computing system, such as computing system 100.

Computing system 150 can be any computing system as defined herein and/or as known in the art at the time of filing and/or as developed thereafter, that includes components that can execute all, or part, of a process for providing healthcare claims assistance, and/or a computing system implemented data management system, in accordance with at least one of the embodiments as described herein.

As discussed in more detail below, in one embodiment, all, or part, of a process for providing healthcare claims assistance, and/or a computing system implemented data management system, and/or data representing and/or associated with one or more healthcare service items associated with one or more healthcare service consumers, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a given consumer and/or user, and/or one or more agents for a given consumer and/or user, and/or a process for providing healthcare claims assistance, and/or one or more healthcare management systems and/or services, and/or a computing system implemented data management system.

In one embodiment, all, or part, of a process for providing healthcare claims assistance, and/or a computing system implemented data management system, and/or data representing and/or associated with one or more healthcare service items associated with one or more healthcare service consumers, is stored in database 170, and is used by, or is accessed by, a process for providing healthcare claims assistance. In one embodiment, database 170 is accessible by one or more healthcare service providers, and/or one or more healthcare insurance providers, and/or one or more healthcare consumers, and/or a provider of and/or a computing system implemented data management system. In one embodiment, database 170 is used, and/or accessible, by a computing system, such as computing systems 100 and/or 150, and/or a server system, such as sever system 120 (discussed below). In one embodiment, database 170 is used, controlled, and/or accessible by, a provider of and/or a computing system implemented healthcare management system.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, all, or part, of a process for providing healthcare claims assistance, and/or a computing system implemented data management system, and/or data representing and/or associated with one or more healthcare service items associated with one or more healthcare service consumers, is stored in server system 120, and is used by, or is accessed by, a process for providing healthcare claims assistance. In one embodiment, server system 120 is accessible by one or more healthcare service providers, and/or one or more healthcare insurance providers, and/or one or more healthcare consumers, and/or a provider of and/or a computing system implemented data management system. In one embodiment, server system 120 is used, and/or accessible, by a computing system, such as computing systems 100 and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, all, or part, of a process for providing healthcare claims assistance, and/or a computing system implemented data management system, and/or data representing and/or associated with one or more healthcare service items associated with one or more healthcare service consumers, is stored in memory system 103 and/or cache memory 103A, of computing system 100, and/or memory system 153 and/or cache memory 153A of computing system 150, and/or in server memory system 123 of server system 120, and/or in database 170, and executed on computing system 100 and/or computing system 150. As used herein, a memory refers to a volatile memory, a non-volatile memory, or any combination of the two.

Although a process for providing healthcare claims assistance, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing healthcare claims assistance and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, all, or part, of a process for providing healthcare claims assistance, and/or a computing system implemented data management system, and/or data representing and/or associated with one or more healthcare service items associated with one or more healthcare service consumers, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "healthcare services consumer", "healthcare service consumer", "healthcare consumer" "consumer", and/or "user" are used interchangeably to denote any person, party, or parties, who provide their information to, or for whom information is gathered by, a process for providing healthcare claims assistance, or for whom interaction with a process for providing healthcare claims assistance is performed, and/or an authorized agent of any person, party, or parties, who provide their information to, or for whom information is gathered by, a process for providing healthcare claims assistance, or for whom interaction with a process for providing healthcare claims assistance is performed.

Herein, the term "healthcare provider" and/or "healthcare service provider" denotes any individual person, persons, agencies, institutions, organizations, businesses, and/or other entities that provide medical treatment, medications, therapy, advice, and/or equipment. For example, herein, the term "healthcare service provider" includes, but is not limited to: doctors; nurses; technicians; therapists; pharmacists; laboratories; counselors; alternative medicine practitioners; medical facilities; doctor's offices; hospitals; emergency rooms; clinics; urgent care centers; alternative medicine clinics/facilities; physical therapy clinics/facilities; and any other entity providing general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the term "healthcare" includes any general and/or specialized treatment, assessment, maintenance, therapy, medication, and/or advice relating to all, or any portion of, a healthcare service consumer's state of health, including but not limited to: general medical, specialized medical, surgical, dental, vision, psychological, and/or any other type of treatment, assessment, maintenance, therapy, medication, and/or advice.

Herein, the term "medical treatment" includes, but is not limited to: one or more medications and/or medication regimes; physical therapy; recommended dietary changes; lab work, recommended activity level changes; other lifestyle changes; and/or surgical procedures; and/or any prescribed and/or suggested regime, medication, treatment, activity, avoided activity, and/or program designed to improve, maintain, and/or slow the degradation of, a healthcare consumer's state of health.

Herein, the terms "healthcare insurance plan", "healthcare benefit plan", and "health insurance program" are used interchangeably to denote any policy, program, means and/or mechanism whereby a healthcare consumer is provided healthcare benefits and/or healthcare services and/or entitlements to any form of healthcare.

Herein, the terms "healthcare insurance provider", "healthcare insurance service provider", "health insurance plan provider" and "health services insurance provider" are used interchangeably to denote any individual person, persons, agencies, institutions, organizations, businesses, and/or other entities that provide one or more healthcare insurance plans.

As used herein, the term "computing system", denotes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented healthcare management systems, packages, programs, modules, or applications; computing system implemented personal and small business financial management systems, packages, programs, modules, or applications; computing system implemented business systems, packages, programs, modules, or applications; computing system implemented data management systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; and various other electronic data driven data management systems, packages, programs, modules, or applications, whether known at the time of filing or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, and/or known at the time of filing, and/or as developed thereafter.

In accordance with one embodiment, a system and method for providing healthcare claims assistance includes a process for providing healthcare claims assistance whereby a given healthcare service consumer's healthcare services data relating to a given healthcare service item is obtained by the process for providing healthcare claims assistance. In one embodiment, the healthcare service consumer's healthcare services data is then translated by the process for providing healthcare claims assistance into a description of the services provided in language, and/or a format, that a typical healthcare service consumer can understand, i.e., translated into "layman terms". In one embodiment, the given healthcare service consumer's healthcare services data is also used by the process for providing healthcare claims assistance to present the healthcare service consumer with a payment calculation display and/or an explanation of how the healthcare service consumer's portion of the claim amount was calculated. In one embodiment, any errors in the given healthcare service consumer's healthcare services data, as perceived by the healthcare service consumer and/or the process for providing healthcare claims assistance, or areas where the healthcare service consumer desires more detail, are identified. In one embodiment, the process for providing healthcare claims assistance then provides the healthcare services consumer with advice on how to proceed to resolve the perceived errors, or further investigate one or more issues, including, but not limited to: advice on what data to double check to insure a perceived error is indeed a legitimate potential error; advice on what party to contact, and in some cases what department within a given party to contact; advice on what information/documentation to have ready; advice on how to state the complaint/description of a perceived error. In one embodiment, the process for providing healthcare claims assistance also provides the healthcare services consumer with any forms required to resolve any perceived errors, or obtain more information, and, in one embodiment, automatically pre-populates the forms with at least part of the relevant healthcare consumer's data.

Figure 2:
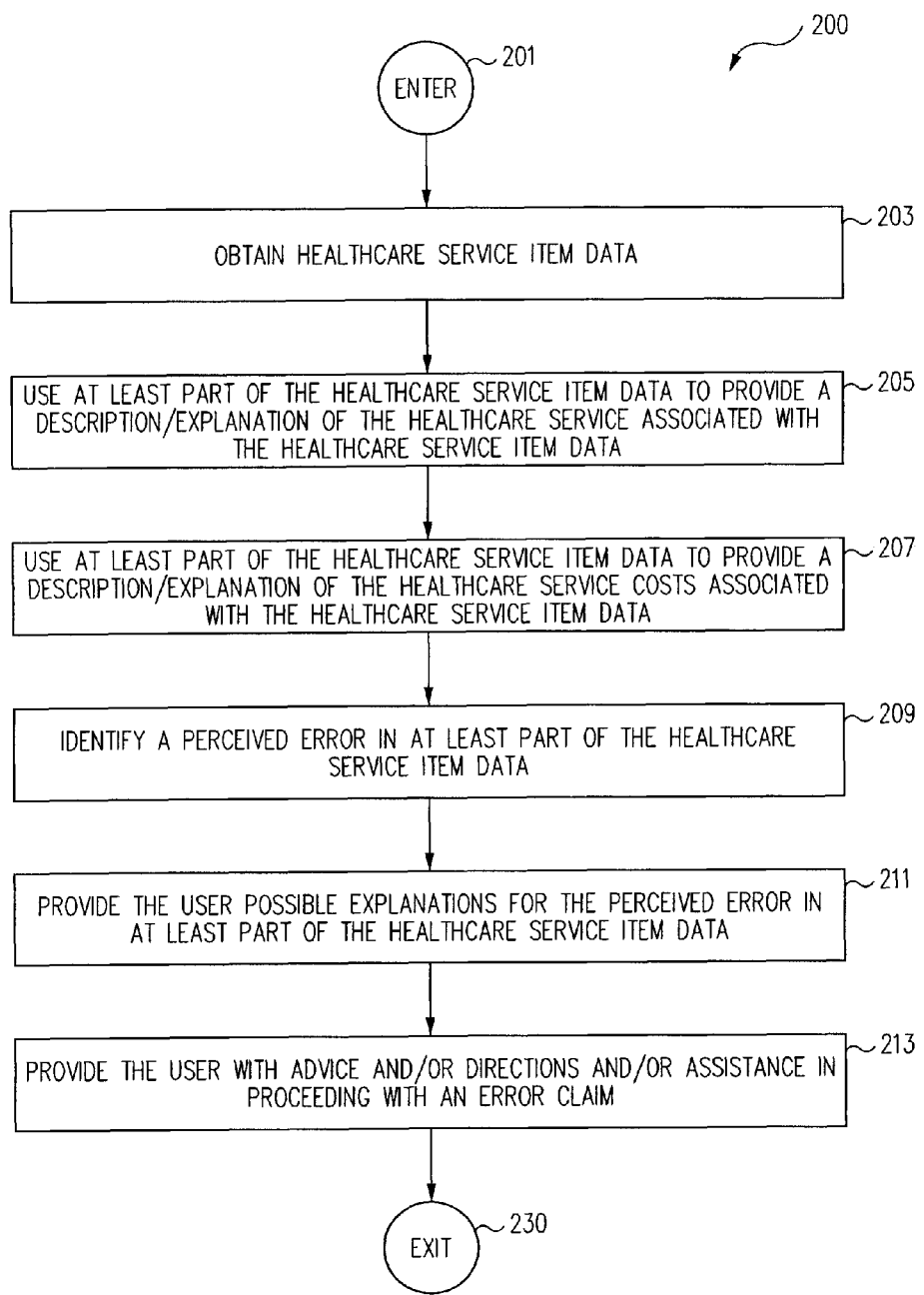
FIG. 2 is a flow chart depicting a process for providing healthcare claims assistance in accordance with one embodiment.

FIG. 2 a flow chart depicting a process for providing healthcare claims assistance 200 in accordance with one embodiment. Process for providing healthcare claims assistance 200 begins at ENTER OPERATION 201 of FIG. 2 and process flow proceeds to OBTAIN HEALTHCARE SERVICE ITEM DATA OPERATION 203.

In one embodiment, at OBTAIN HEALTHCARE SERVICE ITEM DATA OPERATION 203 a given healthcare service consumer's healthcare services data relating to a given healthcare service item is obtained by process for providing healthcare claims assistance 200.

In one embodiment, a healthcare service consumer, or other user, is provided access to process for providing healthcare claims assistance 200 through a website and/or a user interface display on a display screen, such as user interface display 300 of FIG. 3 discussed below. Returning to FIG. 2, in one embodiment, process for providing healthcare claims assistance 200 is provided to a healthcare service consumer, or other user, through a parent computing system implemented data management system, such as computing system implemented data management systems 180 and/or 190 of FIG. 1. Returning to FIG. 2, in one embodiment, process for providing healthcare claims assistance 200 is provided to a healthcare service consumer, or other user, through a parent computing system implemented healthcare management system.

In one embodiment, process for providing healthcare claims assistance 200 is provided to a healthcare service consumer, or other user, as a stand alone application and/or system. In one embodiment, process for providing healthcare claims assistance 200 is provided to a healthcare service consumer, or other user, as an add-on module, application, and/or system. In one embodiment, process for providing healthcare claims assistance 200 is provided to a healthcare service consumer, or other user, through a network portal.

In one embodiment, the given healthcare service consumer's healthcare services data related to a given healthcare service item is obtained at OBTAIN HEALTHCARE SERVICE ITEM DATA OPERATION 203 from, but is not limited to data from: healthcare claims data as submitted by one or more healthcare service providers to one or more healthcare insurance providers; EOB data from one or more healthcare insurance providers; invoice data submitted to the healthcare service consumer by one or more healthcare service providers; and/or any other healthcare services data related to a given healthcare service item from one or more healthcare insurance providers, and/or one or more healthcare service plan administrators, and/or one or more healthcare service providers, and/or the healthcare service consumer, and/or one or more other parties such as, but not limited to, healthcare expense account program providers, healthcare expense account program administrators, and/or any other parties generating and/or having access to an individual's healthcare data.

In one embodiment, the given healthcare service consumer's healthcare services data includes, but is not limited to: names and contact information for specific healthcare service providers; dates of service; types of services rendered; healthcare service codes; claim amounts submitted by healthcare service providers; billing codes; healthcare insurance provider EOB codes; and/or healthcare insurance provider rules governing one or more healthcare insurance plans associated with the healthcare service consumer.

In one embodiment, the given healthcare service consumer's healthcare services data related to a given healthcare service item is obtained at OBTAIN HEALTHCARE SERVICE ITEM DATA OPERATION 203 by linking to one or more databases, and/or computing systems, and/or websites associated with one or more healthcare insurance providers, and/or one or more healthcare service providers, and/or the healthcare service consumer.

In one embodiment, at OBTAIN HEALTHCARE SERVICE ITEM DATA OPERATION 203, the given healthcare service consumer's healthcare services data related to a given healthcare service item is provided to process for providing healthcare claims assistance 200 either directly, or through a computing system implemented data management system that implements, includes, is accessible by, and/or is otherwise associated with, process for providing healthcare claims assistance 200.

In one embodiment, at OBTAIN HEALTHCARE SERVICE ITEM DATA OPERATION 203, the given healthcare service consumer's healthcare services data related to a given healthcare service item is provided to process for providing healthcare claims assistance 200 from the healthcare service consumer via a user interface on a computing system display, such as computing system display device 115 of computing system 100 of FIG. 1, and a user interface device, such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, at OBTAIN HEALTHCARE SERVICE ITEM DATA OPERATION 203, the given healthcare service consumer's healthcare services data related to a given healthcare service item is provided to process for providing healthcare claims assistance 200 by providing process for providing healthcare claims assistance 200, and/or a computing system implemented data management system associated with process for providing healthcare claims assistance 200, access to the data on a database, such as database 170 of FIG. 1, a computing system, such as computing systems 100 and/or 150 of FIG. 1, and/or a server system, such as server system 120 of FIG. 1, or a web-site or other web-based system, and/or using a computer program product as defined herein.

Returning to FIG. 2, In one embodiment, at OBTAIN HEALTHCARE SERVICE ITEM DATA OPERATION 203, the given healthcare service consumer's healthcare services data related to a given healthcare service item is provided to process for providing healthcare claims assistance 200, and/or a computing system implemented data management system associated with process for providing healthcare claims assistance 200, through a network of computing systems and/or server systems that is comprised of multiple different computers, wireless devices, cellular telephones, digital telephones, two-way pagers, personal digital assistants, server computers, or any desired combination of these devices, that are interconnected using a network, such as network 130 of FIG. 1.

Returning to FIG. 2, in one embodiment, at OBTAIN HEALTHCARE SERVICE ITEM DATA OPERATION 203, the given healthcare service consumer's healthcare services data related to a given healthcare service item is provided to process for providing healthcare claims assistance 200, and/or a computing system implemented data management system associated with process for providing healthcare claims assistance 200, through e-mail and/or through text messaging.

In one embodiment, at OBTAIN HEALTHCARE SERVICE ITEM DATA OPERATION 203, the given healthcare service consumer's healthcare services data related to a given healthcare service item is provided to process for providing healthcare claims assistance 200, and/or a computing system implemented data management system associated with process for providing healthcare claims assistance 200, using screen scraping, or a similar technology, as known in the art at the time of filing, and/or as developed after the time of filing.

In one embodiment, at OBTAIN HEALTHCARE SERVICE ITEM DATA OPERATION 203, the given healthcare service consumer's healthcare services data related to a given healthcare service item is provided to process for providing healthcare claims assistance 200, and/or a computing system implemented data management system associated with process for providing healthcare claims assistance 200, using any method, apparatus, process or mechanism for transferring data, images, screen displays, and/or text from one or more devices, computing systems, server systems, databases, web site/web functions and/or any devices to one or more other devices, computing systems, server systems, databases, web site/web functions and/or any devices having a data storage and/or display capability, whether known at the time of filing or as thereafter developed.

Methods, means, and mechanisms for providing, entering, transferring, downloading, and/or otherwise obtaining data are well known to those of skill in the art. Consequently a more detailed discussion of the methods, means, and mechanisms for providing, entering, transferring, downloading, and/or otherwise obtaining data are omitted here to avoid detracting from the invention.

In one embodiment, once a given healthcare service consumer's healthcare services data relating to a given healthcare service item is obtained by process for providing healthcare claims assistance 200 at OBTAIN HEALTHCARE SERVICE ITEM DATA OPERATION 203, the data is stored, in whole, or in part, in a database maintained by, accessible by, owned by, or otherwise related to: process for providing healthcare claims assistance 200, and/or a provider of process for providing healthcare claims assistance 200; a computing system implemented data management system, and/or a provider of a computing system implemented data management system; a computing system implemented healthcare management system, and/or a provider of a computing system implemented healthcare management system; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

In one embodiment, once a given healthcare service consumer's healthcare services data relating to a given healthcare service item is obtained by process for providing healthcare claims assistance 200 at OBTAIN HEALTHCARE SERVICE ITEM DATA OPERATION 203, and, in one embodiment is stored, process flow proceeds to USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205.

In one embodiment, at USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205 at least part of the healthcare service consumer's healthcare services data obtained at OBTAIN HEALTHCARE SERVICE ITEM DATA OPERATION 203 is translated by process for providing healthcare claims assistance 200 into a description of the services. In one embodiment, the description of the services is provided to the user in language, and/or a format, that a typical healthcare service consumer can understand, i.e., the data is translated into "layman terms" or "plain language".

In one embodiment, at USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205 at least part of the healthcare service consumer's healthcare services data obtained at OBTAIN HEALTHCARE SERVICE ITEM DATA OPERATION 203 is translated by process for providing healthcare claims assistance 200 into language and/or a format that a typical healthcare service consumer can understand using one or more databases, such as database 170 of FIG. 1, and/or lookup tables.

Returning to FIG. 2, in one embodiment, at USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205 at least part of the healthcare service consumer's healthcare services data obtained at OBTAIN HEALTHCARE SERVICE ITEM DATA OPERATION 203 is translated by process for providing healthcare claims assistance 200 into language and/or a format that a typical healthcare service consumer can understand using one or more databases and/or lookup tables correlating healthcare service provider and/or medical terminology and/or healthcare insurance provider vocabulary to "plain language" explanations of the types of healthcare services rendered.

In one embodiment, at USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205 at least part of the healthcare service consumer's healthcare services data obtained at OBTAIN HEALTHCARE SERVICE ITEM DATA OPERATION 203 is translated by process for providing healthcare claims assistance 200 into language and/or a format that a typical healthcare service consumer can understand using one or more databases and/or lookup tables correlating healthcare service provider codes and/or healthcare insurance provider codes to "plain language" explanations of the types of healthcare services rendered.

As noted above, in one embodiment, a healthcare service consumer, or other user, is provided access to process for providing healthcare claims assistance 200 through a website and/or a user interface display on a display screen. FIG. 3 is a representation of one specific example of a display screen 300 as would be displayed on a display device, such as display devices 115, 165 and/or 125 of FIG. 1, generated in accordance with one embodiment.

Referring to FIG. 3, display screen 300 includes: claim data section 301; date of service data section 303; healthcare service provider data section 305; healthcare service consumer data section 307; payment calculation display section 309; plain language healthcare services listing 311; status explanation sections 313 and 315; and "what to do" section 317.

As seen in FIG. 3, healthcare services listing 311 includes a plain language explanation of the healthcare services rendered associated with the claim indicated in claim data section 301. In one embodiment, the data and/or listing in healthcare services listing 311 is created at USE AT LEAST PART OF THE HEALTHCARE SERVICE ITEM DATA TO PROVIDE A DESCRIPTION/EXPLANATION OF THE HEALTHCARE SERVICE ASSOCIATED WITH THE HEALTHCARE SERVICE ITEM DATA OPERATION 205 (FIG. 2) using at least part of the healthcare service consumer's healthcare services data obtained at OBTAIN HEALTHCARE SERVICE ITEM DATA OPERATION 203 using one or more databases and/or lookup tables.

Those of skill in the art will readily recognize that the choice of information displayed, the organization of the information displayed, and the manner in which the information is displayed in FIG. 3 and/or in healthcare services listing 311 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

Returning to FIG. 2, in one embodiment, once at least part of the healthcare service consumer's healthcare services data obtained at OBTAIN HEALTHCARE SERVICE ITEM DATA OPERATION 203 is translated by process for providing healthcare claims assistance 200 into language and/or a format that a typical healthcare service consumer can understand at USE AT LEAST PART OF THE HEALTHCARE SERVICE ITEM DATA TO PROVIDE A DESCRIPTION/ EXPLANATION OF THE HEALTHCARE SERVICE ASSOCIATED WITH THE HEALTHCARE SERVICE ITEM DATA OPERATION 205, process flow proceeds to USE AT LEAST PART OF THE HEALTHCARE SERVICE ITEM DATA TO PROVIDE A DESCRIPTION/EXPLANATION OF THE HEALTHCARE SERVICE COSTS ASSOCIATED WITH THE HEALTHCARE SERVICE ITEM DATA OPERATION 207.

In one embodiment, at USE AT LEAST PART OF THE HEALTHCARE SERVICE ITEM DATA TO PROVIDE A DESCRIPTION/EXPLANATION OF THE HEALTHCARE SERVICE COSTS ASSOCIATED WITH THE HEALTHCARE SERVICE ITEM DATA OPERATION 207 at least part of the given healthcare service consumer's healthcare services data of OBTAIN HEALTHCARE SERVICE ITEM DATA OPERATION 203 is used by process for providing healthcare claims assistance 200 to present the healthcare service consumer with a payment calculation display and/or an explanation of how the healthcare service consumer's portion of the claim amount was calculated.

In one embodiment, at USE AT LEAST PART OF THE HEALTHCARE SERVICE ITEM DATA TO PROVIDE A DESCRIPTION/EXPLANATION OF THE HEALTHCARE SERVICE COSTS ASSOCIATED WITH THE HEALTHCARE SERVICE ITEM DATA OPERATION 207 at least part of the given healthcare service consumer's healthcare services data of OBTAIN HEALTHCARE SERVICE ITEM DATA OPERATION 203 is used by process for providing healthcare claims assistance to generate a payment calculation display that includes a display of the various costs involved and/or the calculus used by the healthcare insurance provider and/or healthcare service provider to determine the healthcare service consumer's bill. In one embodiment, the payment calculation display includes a spreadsheet type of display of healthcare insurance plan particulars such as, but not limited to: any payments already made; co-payments required; deductibles; allowed claim amounts; non-allowed claims amounts, and explanations as to why the amounts were not allowed; in-network and out-of-network services; and/or any adjustments made and an explanation of the adjustments. In one embodiment, the healthcare service consumer is provided with this data along with an explanation of how the healthcare service consumer's portion of the claim amount was calculated in a broken down and more easily understood manner than is typically offered healthcare service provider bills and/or healthcare insurance provider's EOBs.

Referring again to FIG. 3, display screen 300 includes payment calculation display section 309 and status explanation sections 313 and 315 as would be generated in one embodiment at USE AT LEAST PART OF THE HEALTHCARE SERVICE ITEM DATA TO PROVIDE A DESCRIPTION/EXPLANATION OF THE HEALTHCARE SERVICE COSTS ASSOCIATED WITH THE HEALTHCARE SERVICE ITEM DATA OPERATION 207 (FIG. 2).

As seen in FIG. 3, payment calculation display section 309 includes a payment calculation display and status explanation sections 313 and 315 include an explanation of how the healthcare service consumer's portion of the claim amount was calculated.

Those of skill in the art will readily recognize that the choice of information displayed, the organization of the information displayed, and the manner in which the information is displayed in FIG. 3 and/or in payment calculation display section 309 and status explanation sections 313 and 315 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

In one embodiment, once at least part of the given healthcare service consumer's healthcare services data of OBTAIN HEALTHCARE SERVICE ITEM DATA OPERATION 203 is used by process for providing healthcare claims assistance 200 to present the healthcare service consumer with a payment calculation display and/or an explanation of how the healthcare service consumer's portion of the claim amount was calculated at USE AT LEAST PART OF THE HEALTHCARE SERVICE ITEM DATA TO PROVIDE A DESCRIPTION/EXPLANATION OF THE HEALTHCARE SERVICE COSTS ASSOCIATED WITH THE HEALTHCARE SERVICE ITEM DATA OPERATION 207, process flow proceeds to IDENTIFY A PERCEIVED ERROR IN AT LEAST PART OF THE HEALTHCARE SERVICE ITEM DATA OPERATION 209.

In one embodiment, at IDENTIFY A PERCEIVED ERROR IN AT LEAST PART OF THE HEALTHCARE SERVICE ITEM DATA OPERATION 209 any errors in the given healthcare service consumer's healthcare services data, as perceived by the healthcare service consumer and/or the process for providing healthcare claims assistance, and/or any areas where a more detailed explanation is desired, are identified.

In one embodiment, at IDENTIFY A PERCEIVED ERROR IN AT LEAST PART OF THE HEALTHCARE SERVICE ITEM DATA OPERATION 209 the given healthcare service consumer's healthcare services data is checked for potential problems such as a denied claims and the healthcare service consumer is alerted any potential problems.

In one embodiment, at IDENTIFY A PERCEIVED ERROR IN AT LEAST PART OF THE HEALTHCARE SERVICE ITEM DATA OPERATION 209 an analysis and/or review of the given healthcare service consumer's healthcare services data is performed by the healthcare service consumer, and/or another user, and any perceived errors in the given healthcare service consumer's healthcare services data, and/or any areas where a more detailed explanation is desired, are identified to process for providing healthcare claims assistance 200 through a user interface and/or user interface device by any means, mechanism, method and/or process as described herein, and/or as known in the art at the time of filing, and/or as developed after the time of filing.

In one embodiment, at IDENTIFY A PERCEIVED ERROR IN AT LEAST PART OF THE HEALTHCARE SERVICE ITEM DATA OPERATION 209 an analysis is made by process for providing healthcare claims assistance 200, based on the obtained healthcare services data for the given healthcare service consumer, as to where any potential errors may have been made in processing the healthcare service consumer's claim and/or in calculating the healthcare service consumer's bill by either the healthcare service provider, the healthcare insurance provider, and/or the healthcare service consumer.

Referring again to FIG. 3, display screen 300 includes plain language healthcare services listing 311 and status explanation sections 313 and 315 as would be generated in one embodiment at IDENTIFY A PERCEIVED ERROR IN AT LEAST PART OF THE HEALTHCARE SERVICE ITEM DATA OPERATION 209.

As seen in FIG. 3, in this particular example, the claim status of "denied" in plain language healthcare services listing 311 has been identified as an error and/or an area where a more detailed explanation is desired.

Those of skill in the art will readily recognize that the choice of information displayed, the organization of the information displayed, and the manner in which the information is displayed in FIG. 3 and/or in plain language healthcare services listing 311 and/or status explanation sections 313 and 315 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

In one embodiment, once any errors in the given healthcare service consumer's healthcare services data, as perceived by the healthcare service consumer and/or the process for providing healthcare claims assistance, and/or any areas where a more detailed explanation is desired, are identified at IDENTIFY A PERCEIVED ERROR IN AT LEAST PART OF THE HEALTHCARE SERVICE ITEM DATA OPERATION 209, process flow proceeds to PROVIDE THE USER POSSIBLE EXPLANATIONS FOR THE PERCEIVED ERROR IN AT LEAST PART OF THE HEALTHCARE SERVICE ITEM DATA OPERATION 211.

In one embodiment, at PROVIDE THE USER POSSIBLE EXPLANATIONS FOR THE PERCEIVED ERROR IN AT LEAST PART OF THE HEALTHCARE SERVICE ITEM DATA OPERATION 211 if the healthcare services consumer perceives that an error was made at IDENTIFY A PERCEIVED ERROR IN AT LEAST PART OF THE HEALTHCARE SERVICE ITEM DATA OPERATION 209, process for providing healthcare claims assistance 200 then provides the healthcare service consumer with possible reasons why the perceived error may have occurred and/or potential issues the healthcare services consumer may have missed that may have resulted in their miscalculation of their bill.

Referring again to FIG. 3, display screen 300 includes and status explanation sections 313 and 315 as would be generated in one embodiment at PROVIDE THE USER POSSIBLE EXPLANATIONS FOR THE PERCEIVED ERROR IN AT LEAST PART OF THE HEALTHCARE SERVICE ITEM DATA OPERATION 211 (FIG. 2).

As seen in FIG. 3, in this particular example, the claim status of "denied" in plain language healthcare services listing 311 has been identified as an error and/or an area where a more detailed explanation is desired at IDENTIFY A PERCEIVED ERROR IN AT LEAST PART OF THE HEALTHCARE SERVICE ITEM DATA OPERATION 209 (FIG. 2). Consequently, at PROVIDE THE USER POSSIBLE EXPLANATIONS FOR THE PERCEIVED ERROR IN AT LEAST PART OF THE HEALTHCARE SERVICE ITEM DATA OPERATION 211 status explanation sections 313 and 315 are generated (FIG. 3). As shown in FIG. 3, in this specific example, status explanation sections 313 and 315 disclose to the user that the status of "denied" is present because no pre-authorization of the healthcare service item was obtained.

Those of skill in the art will readily recognize that the choice of information displayed, the organization of the information displayed, and the manner in which the information is displayed in FIG. 3 and/or in status explanation sections 313 and 315 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

In one embodiment, once process for providing healthcare claims assistance 200 provides the healthcare service consumer with possible reasons why the perceived error may have occurred and/or potential issues the healthcare services consumer may have missed that may have resulted in their miscalculation of their bill at PROVIDE THE USER POSSIBLE EXPLANATIONS FOR THE PERCEIVED ERROR IN AT LEAST PART OF THE HEALTHCARE SERVICE ITEM DATA OPERATION 211, process flow proceeds to PROVIDE THE USER WITH ADVICE AND/OR DIRECTIONS AND/OR ASSISTANCE IN PROCEEDING WITH AN ERROR CLAIM OPERATION 213.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 provides the healthcare services consumer with advice on how to proceed to resolve the perceived errors of IDENTIFY A PERCEIVED ERROR IN AT LEAST PART OF THE HEALTHCARE SERVICE ITEM DATA OPERATION 209 and/or obtain additional relevant information desired.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 informs the healthcare services consumer which party, i.e., the healthcare insurance provider, the healthcare service provider, a healthcare plan administrator, an employer, and/or other party, should be contacted.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 provides the healthcare consumer with information regarding what department to contact and what process for resolving the issues is to be expected.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 also initiates a dispute process with the appropriate party upon user request.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 pre-populates one or more forms associated with the dispute process using the given healthcare service consumer's healthcare services data of OBTAIN HEALTHCARE SERVICE ITEM DATA OPERATION 203 and then sends the populated forms to the appropriate party electronically.

In one embodiment, at PROVIDE THE USER WITH ADVICE AND/OR DIRECTIONS AND/OR ASSISTANCE IN PROCEEDING WITH AN ERROR CLAIM OPERATION 213 process for providing healthcare claims assistance 200 provides the healthcare services consumer with advice on how to proceed to resolve the perceived errors of IDENTIFY A PERCEIVED ERROR IN AT LEAST PART OF THE HEALTHCARE SERVICE ITEM DATA OPERATION 209 including, but not limited to: advice on what data to double check to insure the perceived error is indeed a legitimate potential error; advice on what information/documentation to have ready; and/or advice on how to state the complaint/description of perceived error.

Referring again to FIG. 3, display screen 300 includes "what to do" section 317 as would be generated in one embodiment at PROVIDE THE USER WITH ADVICE AND/OR DIRECTIONS AND/OR ASSISTANCE IN PROCEEDING WITH AN ERROR CLAIM OPERATION 213 (FIG. 2).

As seen in FIG. 3, in this particular example, the claim status of "denied" in plain language healthcare services listing 311 has been identified as an error and/or an area where a more detailed explanation is desired at IDENTIFY A PERCEIVED ERROR IN AT LEAST PART OF THE HEALTHCARE SERVICE ITEM DATA OPERATION 209 (FIG. 2). Consequently, at PROVIDE THE USER WITH ADVICE AND/OR DIRECTIONS AND/OR ASSISTANCE IN PROCEEDING WITH AN ERROR CLAIM OPERATION 213 "what to do" section 317 is generated (FIG. 3). As shown in FIG. 3, in this specific example, "what to do" section 317 discloses to the user that the primary care physician, i.e., the healthcare service provider is the correct party to contact for the purpose of verifying that the pre-authorization was indeed sent to the healthcare insurance provider.

Those of skill in the art will readily recognize that the choice of information displayed, the organization of the information displayed, and the manner in which the information is displayed in FIG. 3 and/or in "what to do" section 317 was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed in FIG. 3 are possible, and that the specific means discussed above do not limit the invention as set forth in the claims below.

Returning to FIG. 2, in one embodiment, once process for providing healthcare claims assistance 200 provides the healthcare services consumer with advice on how to proceed to resolve the perceived errors of IDENTIFY A PERCEIVED ERROR IN AT LEAST PART OF THE HEALTHCARE SERVICE ITEM DATA OPERATION 209, and/or obtain more information, at PROVIDE THE USER WITH ADVICE AND/OR DIRECTIONS AND/OR ASSISTANCE IN PROCEEDING WITH AN ERROR CLAIM OPERATION 213, process flow proceeds to EXIT OPERATION 230. In one embodiment, at EXIT OPERATION 230, process for providing healthcare claims assistance 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing healthcare claims assistance 200, healthcare service consumers are provided with: a description of the healthcare services provided in language and/or a format that a typical healthcare service consumer can understand; a payment calculation display including an explanation of how the healthcare service consumer's portion of the claim amount was calculated; and advice on how to proceed to resolve any perceived errors, including, but not limited to, advice on what data to double check to insure the perceived error is indeed a legitimate potential error, advice on what party to contact, and in some cases what department within a given party to contact, advice on what information/documentation to have ready, advice on how to state the complaint/description of perceived error. Consequently, using process for providing healthcare claims assistance 200, healthcare consumers are better informed and save significant time resolving potential issues with their healthcare service bills. In addition, using process for providing healthcare claims assistance 200, healthcare service providers, healthcare insurance providers, employers, and/or plan administrators, spend less time dealing with phone calls and letters from healthcare service consumers who have incorrectly called their offices.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "using", "identifying", "providing", "translating". "correlating", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus, means, or system for performing the operations described herein. This apparatus, means, or system may be specifically constructed for the required purposes, or the apparatus, means, or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of networks, are defined herein, operating over numerous topologies.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of various embodiments include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A system for providing healthcare claims assistance comprising:
    a processor; and
    a memory coupled to the processor, the memory having instructions stored therein which when executed by the processor, perform a process comprising:
    obtaining, at a healthcare service consumer computing system under the control of a healthcare service consumer, healthcare service item data associated with the healthcare service consumer, the healthcare service item data being associated with a given healthcare service item and involving at least three parties selected from the group of the healthcare service consumer, a healthcare insurance provider, a healthcare service provider, and healthcare plan administrator, and an employer;
    using at least part of the healthcare service item data to generate, at the healthcare service consumer computing system, a translated description of one or more healthcare services rendered that are associated with the healthcare service item;
    using at least part of the healthcare service item data to generate, at the healthcare service consumer computing system, a payment calculation display showing at least a portion of the costs and/or payments associated with the healthcare service item;
    identifying, at the healthcare service consumer computing system, one or more errors in the healthcare service item data;
    identifying at least one of the at least three parties responsible to resolve the one or more errors;
    providing the healthcare consumer with one or more forms required to resolve the one or more errors, at least one of the one or more forms being required to proceed with a dispute resolution process related to the one or more errors;
    pre-populating, at the healthcare service consumer computing system, at least part of the one or more forms required to proceed with a dispute resolution process related to the at least part of the healthcare service item data using at least part of the healthcare service item data; and
    electronically sending the one or more forms to the at least one of the at least three parties to contact to resolve the one or more errors.

2. The system for providing healthcare claims assistance of claim 1, wherein;
    at least part of the healthcare service item data associated with a healthcare service consumer is obtained from at least one of the sources of healthcare service item data selected from the group of sources of healthcare service item data consisting of:
    healthcare claims data as submitted by one or more healthcare service providers to one or more healthcare insurance providers;
    Explanation OF Benefits (EOB) data from one or more healthcare insurance providers;
    invoice data submitted to the healthcare service consumer by one or more healthcare service providers;
    data from one or more healthcare service plan administrators;
    data from one or more healthcare service providers;
    data from a healthcare service consumer;
    data from one or more healthcare expense account program providers; and
    data from one or more healthcare expense account program administrators.

3. The system for providing healthcare claims assistance of claim 1, wherein;
    at least part of the healthcare service item data associated with a healthcare service consumer includes healthcare service item data selected from the group of healthcare service item data consisting of:
    names or other contact information for specific healthcare service providers;
    dates when healthcare service were provided;
    types of healthcare services rendered;
    healthcare service codes;
    claim amounts submitted by healthcare service providers;
    billing codes;
    healthcare insurance provider EOB codes; and
    healthcare insurance provider rules governing one or more healthcare insurance plans associated with a healthcare service consumer.

4. The system for providing healthcare claims assistance of claim 1, wherein;
    using at least part of the healthcare service item data to generate a translated description of one or more healthcare services rendered that are associated with the healthcare service item comprises translating healthcare service codes into text.

5. The system for providing healthcare claims assistance of claim 4, wherein;

translating healthcare service codes into text is accomplished using a database correlating healthcare service codes to text descriptions of associated healthcare services.

6. The system for providing healthcare claims assistance of claim 4, wherein;

translating healthcare service codes into text is accomplished using one or more look up tables relating healthcare service codes to text descriptions of associated healthcare services.

7. The system for providing healthcare claims assistance of claim 1, wherein;

using at least part of the healthcare service item data to generate a translated description of one or more healthcare services rendered that are associated with the healthcare service item comprises translating EOB codes into text.

8. The system for providing healthcare claims assistance of claim 7, wherein;

translating EOB codes into text is accomplished using a database correlating EOB codes to text descriptions of associated healthcare services.

9. The system for providing healthcare claims assistance of claim 7, wherein;

translating EOB codes into text is accomplished using one or more look up tables relating EOB codes to text descriptions of associated healthcare services.

10. The system for providing healthcare claims assistance of claim 1, wherein;

using at least part of the healthcare service item data to generate a translated description of one or more healthcare services rendered that are associated with the healthcare service item comprises translating medical terminology into plain language text.

11. The system for providing healthcare claims assistance of claim 1, further comprising providing the user advice regarding what information/documentation to gather to proceed with a dispute resolution process related to the at least part of the healthcare service item data.

12. The system for providing healthcare claims assistance of claim 1 further comprising providing the user advice regarding how to state a complaint/description regarding the one or more identified errors.

13. The system for providing healthcare claims assistance of claim 1, further comprising electronically initiating a dispute resolution process related to the at least part of the healthcare service item data.

14. A computer program product for providing a process for providing healthcare claims assistance comprising:

a nontransitory computer readable medium;

and computer program code, encoded on the computer readable medium, comprising computer readable instructions which when executed by a processor perform a process comprising:

obtaining, at a healthcare service consumer computing system under the control of a healthcare service consumer, healthcare service item data associated with the healthcare service consumer, the healthcare service item data being associated with a given healthcare service item and involving at least three parties selected from the group of the healthcare service consumer, a healthcare insurance provider, a healthcare service provider, and healthcare plan administrator, and an employer;

using at least part of the healthcare service item data to generate, at the healthcare service consumer computing system, a translated description of one or more healthcare services rendered that are associated with the healthcare service item;

using at least part of the healthcare service item data to generate, at the healthcare service consumer computing system, a payment calculation display showing at least a portion of the costs and/or payments associated with the healthcare service item;

identifying, at the healthcare service consumer computing system, one or more errors in the healthcare service item data;

identifying at least one of the at least three parties responsible to resolve the one or more errors;

providing the healthcare consumer with one or more forms required to resolve the one or more errors, at least one of the one or more forms being required to proceed with a dispute resolution process related to the one or more errors;

pre-populating, at the healthcare service consumer computing system, at least part of the one or more forms required to proceed with a dispute resolution process related to the at least part of the healthcare service item data using at least part of the healthcare service item data; and electronically sending the one or more forms to the at least one of the at least three parties to contact to resolve the one or more errors.

15. The computer program product for providing a process for providing healthcare claims assistance of claim 14, wherein;

at least part of the healthcare service item data associated with a healthcare service consumer is obtained from at least one of the sources of healthcare service item data selected from the group of sources of healthcare service item data consisting of:

healthcare claims data as submitted by one or more healthcare service providers to one or more healthcare insurance providers;

Explanation OF Benefits (EOB) data from one or more healthcare insurance providers;

invoice data submitted to the healthcare service consumer by one or more healthcare service providers;

data from one or more healthcare service plan administrators;

data from one or more healthcare service providers;

data from a healthcare service consumer;

data from one or more healthcare expense account program providers; and data from one or more healthcare expense account program administrators.

16. The computer program product for providing a process for providing healthcare claims assistance of claim 14, wherein;

at least part of the healthcare service item data associated with a healthcare service consumer includes healthcare service item data selected from the group of healthcare service item data consisting of:

names or other contact information for specific healthcare service providers;

dates when healthcare service were provided;

types of healthcare services rendered;

healthcare service codes;

claim amounts submitted by healthcare service providers;

billing codes;

healthcare insurance provider EOB codes; and healthcare insurance provider rules governing one or more healthcare insurance plans associated with a healthcare service consumer.

17. The computer program product for providing a process for providing healthcare claims assistance of claim 14, wherein;
  using at least part of the healthcare service item data to generate a translated description of one or more healthcare services rendered that are associated with the healthcare service item comprises translating healthcare service codes into text.

18. The computer program product for providing a process for providing healthcare claims assistance of claim 17, wherein;
  translating healthcare service codes into text is accomplished using a database correlating healthcare service codes to text descriptions of associated healthcare services.

19. The computer program product for providing a process for providing healthcare claims assistance of claim 17, wherein;
  translating healthcare service codes into text is accomplished using one or more look up tables relating healthcare service codes to text descriptions of associated healthcare services.

20. The computer program product for providing a process for providing healthcare claims assistance of claim 14, wherein;
  using at least part of the healthcare service item data to generate a translated description of one or more healthcare services rendered that are associated with the healthcare service item comprises translating EOB codes into text.

21. The computer program product for providing a process for providing healthcare claims assistance of claim 20, wherein;
  translating EOB codes into text is accomplished using a database correlating EOB codes to text descriptions of associated healthcare services.

22. The computer program product for providing a process for providing healthcare claims assistance of claim 20, wherein;
  translating EOB codes into text is accomplished using one or more look up tables relating EOB codes to text descriptions of associated healthcare services.

23. The computer program product for providing a process for providing healthcare claims assistance of claim 14, wherein;
  using at least part of the healthcare service item data to generate a translated description of one or more healthcare services rendered that are associated with the healthcare service item comprises translating medical terminology into plain language text.

24. The computer program product for providing a process for providing healthcare claims assistance of claim 14 further comprising
  providing the user advice regarding what party to contact to obtain more information about the at least part of the healthcare service item data.

25. The computer program product for providing a process for providing healthcare claims assistance of claim 14 further comprising
  providing the user advice regarding what information/documentation to gather to proceed with a dispute resolution process related to the at least part of the healthcare service item data.

26. The computer program product for providing a process for providing healthcare claims assistance of claim 14 further comprising
  providing the user advice regarding how to state a complaint/description regarding a the one or more identified errors.

27. The computer program product for providing a process for providing healthcare claims assistance of claim 14, further comprising;
  electronically initiating a dispute resolution process related to the at least part of the healthcare service item data.

* * * * *

UNITED STATES PATENT AND TRADEMARK OFFICE
CERTIFICATE OF CORRECTION

PATENT NO. : 8,108,227 B1
APPLICATION NO. : 12/271242
DATED : January 31, 2012
INVENTOR(S) : Lisa Herrup Rogers et al.

Page 1 of 1

It is certified that error appears in the above-identified patent and that said Letters Patent is hereby corrected as shown below:

In the Claims

In Column 28, Line 32, Claim 26, after "regarding" and before "the", delete "a".

Signed and Sealed this
Third Day of June, 2014

Michelle K. Lee
*Deputy Director of the United States Patent and Trademark Office*